(12) United States Patent
Koga et al.

(10) Patent No.: US 10,344,191 B2
(45) Date of Patent: Jul. 9, 2019

(54) PHOTOCURABLE ADHESIVE

(71) Applicants: DENSO CORPORATION, Kariya, Aichi-pref. (JP); ADEKA CORPORATION, Arakawa-ku, Tokyo (JP)

(72) Inventors: Kenji Koga, Kariya (JP); Daisuke Takama, Kariya (JP); Ryo Ogawa, Kounosu (JP); Shinsuke Yamada, Nagareyama (JP); Takuya Matsuda, Arakawa (JP)

(73) Assignees: DENSO CORPORATION, Kariya, Aichi-pref. (JP); ADEKA CORPORATION, Arakawa-ku, Tokyo (JP)

( * ) Notice: Subject to any disclaimer, the term of this patent is extended or adjusted under 35 U.S.C. 154(b) by 94 days.

(21) Appl. No.: 15/312,736

(22) PCT Filed: May 22, 2015

(86) PCT No.: PCT/JP2015/064802
§ 371 (c)(1),
(2) Date: Nov. 21, 2016

(87) PCT Pub. No.: WO2015/178491
PCT Pub. Date: Nov. 26, 2015

(65) Prior Publication Data
US 2017/0145268 A1    May 25, 2017

(30) Foreign Application Priority Data

May 22, 2014  (JP) ................................. 2014-106326

(51) Int. Cl.
| | |
|---|---|
| *C09J 163/00* | (2006.01) |
| *C08K 3/04* | (2006.01) |
| *C08K 3/22* | (2006.01) |
| *C08K 3/36* | (2006.01) |
| *C08G 59/50* | (2006.01) |
| *C08L 79/04* | (2006.01) |

(52) U.S. Cl.
CPC ............ *C09J 163/00* (2013.01); *C08G 59/50* (2013.01); *C08K 3/36* (2013.01); *C08L 79/04* (2013.01); *C08K 3/04* (2013.01); *C08K 3/22* (2013.01); *C08K 2003/2227* (2013.01)

(58) Field of Classification Search
None
See application file for complete search history.

(56) References Cited

U.S. PATENT DOCUMENTS

| | | | |
|---|---|---|---|
| 2003/0131932 A1* | 7/2003 | Hoult .................. | B29C 35/0272 156/272.8 |
| 2011/0051588 A1 | 3/2011 | Okamura et al. | |
| 2012/0123082 A1* | 5/2012 | Ogawa ................ | C08G 59/184 528/93 |
| 2017/0066230 A1* | 3/2017 | Nakajima ................ | C08J 3/241 |
| 2017/0066899 A1* | 3/2017 | Nakajima ............ | C08G 59/188 |

FOREIGN PATENT DOCUMENTS

| | | | | |
|---|---|---|---|---|
| JP | 2001250290 A | 9/2001 | | |
| JP | 2010180352 A | 8/2010 | | |
| JP | 2011052033 A | 3/2011 | | |
| JP | 2011058005 A | 3/2011 | | |
| WO | WO 2015/136770 A1 * | 9/2015 | ............. | C08J 3/241 |
| WO | WO 2015/136771 A1 * | 9/2015 | ........... | C08G 59/188 |

OTHER PUBLICATIONS

Machine translation of JP 2010-180352 A (no date).*

* cited by examiner

*Primary Examiner* — Michael J Feely
(74) *Attorney, Agent, or Firm* — Harness, Dickey & Pierce, P.L.C.

(57) ABSTRACT

Provided is a photocurable adhesive with which curing by direct irradiation of laser light is possible with almost no occurrence of surface carbonization and which is capable of satisfactory curing even when the coating thickness is increased. A photocurable adhesive, which is cured by irradiation of laser light, is provided. The curable adhesive contains an epoxy adhesive component, a light-absorbing component for thermal curing of the epoxy adhesive component by absorption of laser light, and an inorganic filler. The content of the light-absorbing component is 0.1 mass % or less. The pre-curing thermal conductivity of the photocurable adhesive is at least 0.2 W/m·K and the post-curing thermal conductivity is at least 0.5 W/m·K.

8 Claims, 4 Drawing Sheets

PHOTOCURABLE ADHESIVE

CROSS REFERENCE TO RELATED APPLICATIONS

This application is a U.S. National Phase Application under 35 U.S.C. 371 of International Application No. PCT/JP2015/064802 filed on May 22, 2015 and Published in Japanese as WO 2015/178491 A1 on Nov. 26, 2015. This application is based on and claims the benefit of priority from earlier Japanese Patent Application No. 2014-106326 filed on May 22, 2014. The entire disclosures of all of the above applications are incorporated herein by reference.

TECHNICAL FIELD

This invention relates to a photocurable adhesive cured by laser light.

BACKGROUND ART

Two members are bonded using a photocurable adhesive which includes a light absorption component of an epoxy type adhesive component and/or carbon black or the like (refer to Patent Document 1, for example). Specifically, a bond part of the two members which is formed by coating the photocurable adhesive between the two members is irradiated by laser light. The laser light transmitting through the two members causes the photocurable adhesive to be cured. Thereby, the two members are bonded.

RELATED ART

Patent Document

[Patent Document 1] Japanese Patent Application Laid-Open Publication No. 2010-180352

DISCLOSURE OF THE INVENTION

Problems to be Solved by the Invention

However, it is required to reduce a thickness of a conventionally used photocurable adhesive to cure the photocurable adhesive sufficiently. When the thickness of the photocurable adhesive is increased, a surface of the photocurable adhesive is cured. However, curing of the inside of the photocurable adhesive easily becomes insufficient. Further, direct irradiation with laser light to the conventionally used photocurable adhesive is liable to carbonize or burn off the surface of the photocurable adhesive. Therefore, for example, it is difficult apply this to applications using direct irradiation of laser light to the photocurable adhesive, which applies to an adherend in a state that the surface of the photocurable adhesive is exposed. Specifically, for example, it is difficult to use a photocurable adhesive instead of soldering or screw fixation.

The present invention has been made in order to solve the above-described issue, and has as its object to provide a photocurable adhesive which can be sufficiently cured even when a coating thickness of the photocurable adhesive is increased, and capable of curing the photocurable adhesive by direct irradiation with laser light without substantially carbonizing the surface of the photocurable adhesive.

Means for Solving the Problems

One embodiment of the present disclosure is a photocurable adhesive curable by irradiation with laser light. The photocurable adhesive includes an epoxy type adhesive component, a light absorption component which thermally cures the epoxy type adhesive component by absorption of the laser light, and an inorganic filler. A contained amount of the light absorption component is no more than 0.1 mass %. A thermal conductivity before curing of the photocurable adhesive is no less than 0.2 W/m·K. The thermal conductivity after curing of the photocurable adhesive is no less than 0.5 W/m·K.

Effects of the Invention

In the above-described curable adhesive, a contained amount of a light absorption component is no more than the above-described predetermined amount and is adjusted to be relatively small. Therefore, carbonization of a surface of the above-described photocurable adhesive is reduced even when being directly irradiated by laser light.

Further, the photocurable adhesive includes an inorganic filler, a thermal conductivity before and after curing of the photocurable adhesive is adjusted to the above-described value or higher. Therefore, even if a thickness of the photocurable adhesive is increased, an epoxy type adhesive component in the photocurable adhesive is sufficiently thermally cured by irradiation with the laser light from a surface to an inside of the photocurable adhesive. This permits using the photocurable adhesive instead of soldering or screw fixation.

In this way, the photocurable adhesive can be sufficiently cured even when a coating thickness thereof is increased. Further, the photocurable adhesive can be cured by direct irradiation with the laser light without substantially carbonizing the surface of the photocurable adhesive.

MODE FOR CARRYING OUT THE INVENTION

Figure 1:
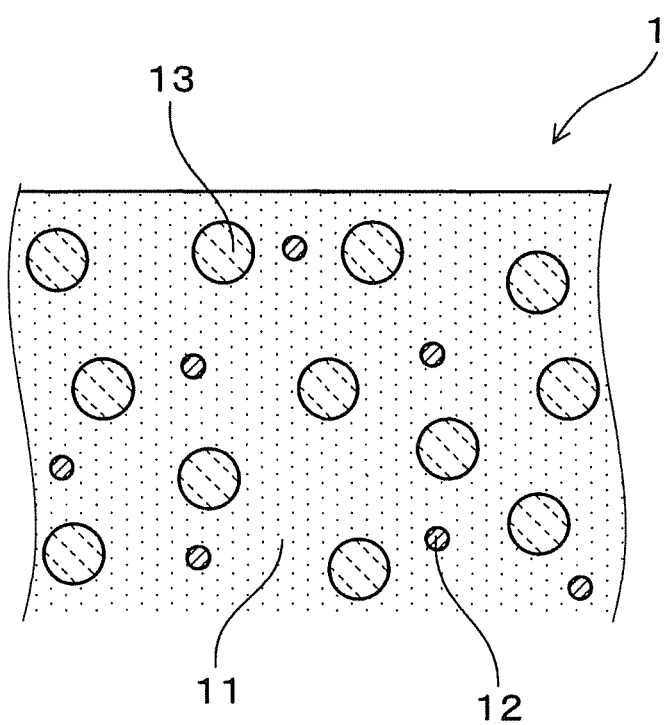
FIG. 1 shows a cross-sectional view of a photocurable adhesive according to a first embodiment of the present invention.

The above-described photocurable adhesive includes an epoxy type adhesive component. A one liquid type cyanate-epoxy complex resin composition or the like which is cured by heating may be used as the epoxy type adhesive component. The epoxy type adhesive component may include, for example, an epoxy resin (B) and a cyanate ester resin (A) when needed and/or a latent hardener (C).

The latent hardener (C) includes, for example, a modified polyamine (a) which has one or more amino groups which have active hydrogen in the molecule, and a phenolic resin (b). The modified polyamine (a) may be obtained, for example, by reaction between a polyamine compound and an epoxy compound. The polyamine compound includes, for example, (1) a diamine having any two from primary and/or secondary amino groups differing respectively in reactivity in a molecule and/or (2) an aromatic polyamine and/or an alicyclic polyamine and/or an aliphatic polyamine having any two or more from the primary and/or the secondary amino groups in the molecule. In a case that any one of the primary and/or the secondary amino groups described in (2) reacts with an epoxide group, the other primary and/or the secondary amino groups have a low reactivity with the epoxide group due to steric hindrance. The polyamine compound is preferably a 2-aminopropyl imidazole compound. Further, the epoxy compound is, for example, a polyglycidyl ether compound having two or more epoxide groups in a molecule.

When a contained amount of the epoxy resin (B) in the epoxy type adhesive component is decreased excessively, sufficient curability may be not obtained. On the other hand, if the contained amount of the epoxy resin (B) is increased excessively, it is liable to have a problem that the physical properties of the curing material are deteriorated. Therefore, the epoxy type adhesive component includes an amount of preferably 1 to 10000 parts by mass of the epoxy resin (B) relative to 100 parts by mass of the cyanate ester resin (A).

The cyanate ester resin (A) is not limited especially but it is preferably any one or more selected from the group consisting of a polymer indicated by formula (1), a polymer indicated by formula (2) and prepolymers of these polymers.

In the formula (1), R1 is an unsubstituted or a fluorine-substituted bivalent hydrocarbon radical, —O—, —S— or a single bond, R2 and R3 are each independently an unsubstituted phenylene group or an unsubstituted or a fluorine-substituted phenylene group substituted by a 1 to 4C alkyl group or the like.

Formula (2)

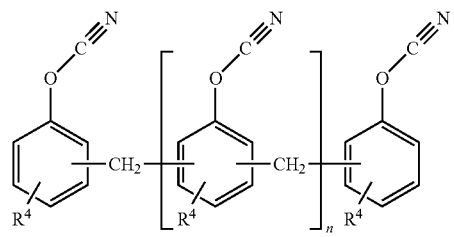

In the formula (2), n is an integer and 1 or more, R4 is a hydrogen atom or a 1 to 4C alkyl group or the like.

In the polymers indicated by formula (1) and (2), a prepolymer having a part of a cyanate group forming a part of a triazine ring, may be also used by the cyanate ester resin (A). Such prepolymers, for example, may include those in which all or part of the polymer of the above formula (1) is trimerized.

The cyanate ester resin (A) is more preferably a polymer indicated by the following formula (3) or a prepolymer of this polymer. The polymer indicated by formula (3) may be used independently or as a mixture of two or more polymers.

Formula (3)

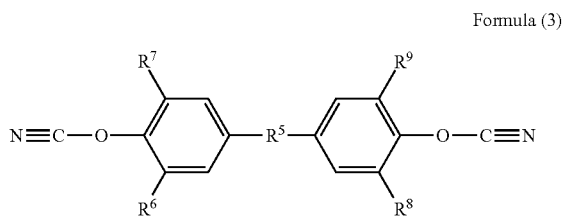

R6, R7, R8 and R9 indicated by the formula (3) are each independently a hydrogen atom or an unsubstituted or a fluorine-substituted methyl group. R5 is a group indicated by the following formula (4).

Formula (4)

R10 and R11 are each independently a hydrogen atom or an unsubstituted or a fluorine-substituted methyl group or groups indicated by the following formula (5) to formula (12). n indicated in formula (7) is an integer 4 to 12 inclusive.

Formula (5)

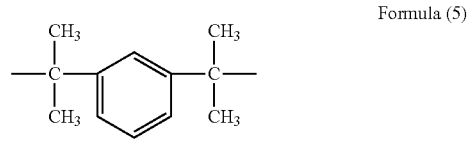

Formula (6)

Formula (7)

Formula (8)

Formula (9)

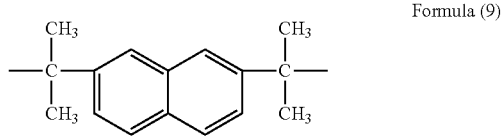

Formula (10)

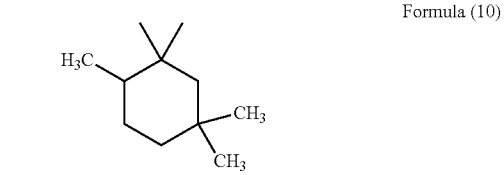

-continued

Formula (11)

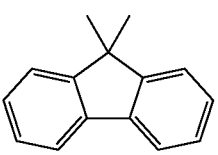

Formula (12)

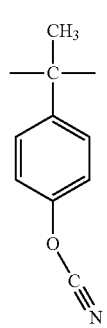

Any one or more selected from the group consisting of 4,4'-ethylidene-bis-phenylene cyanate and 2,2-bis (4-cyanatophenyl) propane and (4-cyanato-3,5-dimethylphenyl) methane is specifically preferable as the cyanate ester resin (A).

The epoxy resin (B) is not limited especially, but, for example, the epoxy resin (B) includes a mononuclear polyhydric phenol compound of a polyglycidyl ether compound such as hydroquinone, resorcinol, pyrocatechol or phloroglukcinol; a polyglycidyl ether compound of a polynuclear polyhydric phenol compound such as dihydroxynaphthalene, biphenol, methylene bisphenol (bisphenol F), methylenebis (ortho-cresol), ethylidene bisphenol, isopropylidene bisphenol (bisphenol A), isopropylidene bis (ortho-cresol), tetrabromobisphenol A, 1,3-bis (4-hydroxy-cumyl benzene), 1,4-bis (4-hydroxy-cumyl benzene), 1,1,3-tris (4-hydroxyphenyl) butane, 1,1,2,2-tetra (4-hydroxyphenyl) ethane, thiobisphenol, sulfo bisphenol, oxy bisphenol, phenol novolak, ortho-cresol novolak, ethylphenol novolak, butylphenol novolak, octylphenol novolak or resorcin novolak terpene phenol; polyglycidyl ethers of polyhydric alcohols such as ethylene glycol, propylene glycol, butylene glycol, hexanediol, polyglycol, thiodiglycol, glycerol, trimethylolpropane, pentaerythritol, sorbitol and bisphenol A-ethylene oxide adducts; a glycidyl ether compound of aromatic or alicyclic polybasic acids and homopolymers or copolymers of glycidyl methacrylate such as maleic acid, fumaric acid, itaconic acid, succinic acid, glutaric acid, suberic acid, adipic acid, azelaic acid, sebacic acid, dimer acids, trimer acids, phthalic acid, isophthalic acid, terephthalic acid, trimellitic acid, trimesic acid, pyromellitic acid, tetrahydrophthalic acid, hexahydrophthalic acid and aliphatic compounds such endomethylene tetrahydrophthalic acid; an epoxy compound having a glycidyl amino group such as N,N-diglycidyl aniline, bis (4-(N-methyl-N-glycidylamino) phenyl) methane or diglycidyl ortho-toluidine; an epoxidized material of cyclic olefin compounds such as vinylcyclohexene diepoxide, dicyclopentadine diepoxide, 3,4-epoxycyclohexylmethyl-3,4-epoxy cyclohexane carboxylate, 3,4-epoxy-6-methylcyclohexyl-methyl-6-methylcyclohexane carboxylate or bis (3,4-epoxy-6-methylcyclohexyl methyl) adipate; heterocyclic compounds such as epoxidized polybutadiene, epoxidized styrene—epoxidized conjugated diene polymer such as butadiene copolymer and triglycidyl isocyanurate or the like. In addition, these epoxy resins may have been internally cross-linked by prepolymer terminal isocyanate or a polyvalent active hydrogen compound (polyhydric phenol, a polyamine, a carbonyl group-containing compound, polyphosphoric acid esters, etc.) in which the molecular weight is good.

The polyamine compound used for formation of the modified polyamine (a) including in the latent hardener includes, for example, an aliphatic polyamine such as ethylenediamine, diethylenetriamine, triethylenetetramine, tetraethylenepentamine, polyoxypropylenediamine, polyoxypropylenetriamine, an alicyclic polyamine such as isophoronediamine, menthanediamine, bis (4-amino-3-methyldicyclohexyl) methane, diaminodicyclohexylmethane, bis (aminomethyl) cyclohexane, N-aminoethyl piperazine or 3-9-bis (3-aminopropyl)-2,4,8,10-tetraoxaspiro[5.5] undecane; a mononuclear polyamine such as meta-phenylenediamine, para-phenylenediamine, tolylene-2,4-diamine, tolylene-2,6-diamine, mesitylene-2,4-diamine, mesitylene-2,6-diamine, 3,5-diethyltolylene-2,4-diamine or 3,5-diethyltolylene-2,6-diamine; an aromatic polyamine such as biphenylenediamine, 4,4-diaminodiphenylmethane, 2,5-naphthylene diamine or 2,6-naphthylene diamine; imidazoles such as 2-aminopropylimidazole or the like.

Among the above-described polyamine compounds, the polyamine compound is preferably (1) a diamine having any two from primary and/or secondary amino groups differing respectively in a molecule and/or (2) an aromatic polyamine and/or an alicyclic polyamine and/or an aliphatic polyamine having any two or more from the primary and/or the secondary amino groups in the molecule. In a case that any one of the primary and/or the secondary amino groups described in (2) reacts with an epoxide group, the other primary and/or the secondary amino groups have a low reactivity with the epoxide group due to steric hindrance. This is because adherence and the curing properties or the like are improved by using such a polyamine compound.

The above-described diamine (1) includes, for example, an isophoronediamine, menthane diamine, 2,2,4-trimethylhexamethylene diamine, 2,4,4-trimethylhexamethylene diamine, 1,2-diaminopropane or the like. The above-described diamine (2) includes, for example, a meta-xylylendiamine, a 1,3-bisamino cyclohexane or the like. These diamines are not limited especially.

An imidazole compound including a primary amino group of 2-aminopropyl imidazole or the like as the polyamine compound may be advantageously used. This is because using these polyamine compounds allows low-temperature curing properties to improve.

The epoxy compound used for formation of the modified polyamine (a) by a reaction with the polyamine compound includes, for example, a mono glycidyl ether compound such as phenyl glycidyl ether, allyl glycidyl ether, methyl glycidyl ether, butyl glycidyl ether, secondary butyl glycidyl ether, 2-ethylhexyl glycidyl ether, 2-methyl-octyl glycidyl ether or stearyl glycidyl ether; a mono glycidyl ester compound such as Versatic acid glycidyl ester, polyglycidyl ether compounds of mononuclear polyhydric phenol compounds such as hydroquinone, resorcinol, pyrocatechol and phloroglucinol; polyglycidyl ether compounds of polynuclear polyhydric phenol compound such as dihydroxynaphthalene, biphenol, methylene bisphenol (bisphenol F), methylenebis (ortho-cresol), ethylidenebisphenol, isopropylidene bisphenol (bisphenol A), isopropylidene bis (ortho-cresol), tetrabromobisphenol A, 1,3-bis (4-hydroxy-cumyl benzene), 1,4-bis (4-hydroxy-cumyl benzene), 1,1,3-tris (4-hydroxyphenyl) butane, 1,1,2,2-tetra (4-hydroxyphenyl) ethane, thiobisphenol, sulfo bisphenol, oxy bisphenol, phenol novolak, ortho-cresol novolak, ethyl phenol novolak, butyl phenol novolak, octyl phenol novolak, resorcinol novolak and terpene phenol; polyglycidyl ethers of polyhydric alcohols such as ethylene glycol, propylene glycol, butylene glycol, hexanediol, polyglycol, thiodiglycol, glycerin, trimethylolpropane, pentaerythritol, sorbitol and adduct of bisphenol A with ethylene oxide; an aliphatic, an aromatic or an alicyclic polybasic acid homopolymer of glycidyl esters and glycidyl methacrylate or copolymers such as maleic acid, fumaric acid, itaconic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, or endomethylene tetrahydrophthalic acid; an epoxy compound having glycidylamino group such as N,N-diglycidyl aniline, bis (4-(N-methyl-N-glycidyl-amino) phenyl) methane or diglycidyl ortho-toluidine; an epoxidized material of a cyclic olefin compound such as vinylcyclohexene diepoxide, dicyclopentane diepoxide, 3,4-epoxycyclohexylmethyl-3,4-epoxy cyclohexane carboxylate, 3,4-epoxy 6-methyl cyclohexyl methyl-6-methylcyclohexane carboxylate or bis (3,4-epoxy-6-methylcyclohexyl methyl) adipate; an epoxidized conjugated diene polymer such as epoxidized polybutadiene or epoxidized styrene-butadiene copolymer; a heterocyclic compound such as triglycidyl isocyanurate or the like.

As the epoxidized compound, preferably, a polyglycidyl ether compound having two or more epoxide groups in a molecule is desirable. More preferably, a polyglycidyl ether of the bisphenol compound such as methylene bisphenol (bisphenol F), methylenebis (ortho-cresol), ethylidenebisphenol, isopropylidene bisphenol (bisphenol A) or isopropylidene bis (ortho-cresol) is desirable.

Here, as the polyamine compound, when a polyamine having primary and two or more together secondary amino group is used, the modified polyamine (a) is, with respect to 1 mol of the polyamine compound, an epoxy equivalent of the epoxy compound is preferably 0.5 to 2 equivalents. And it is preferably, more preferably 0.8 to 1.5 equivalents. A modified amine is preferably obtained by using the above-described epoxy equivalent of the epoxy compound.

In addition, as the polyamine compound, such as using combination of a modified amine obtained by using the above-described polyamine (1) and a modified amine obtained by using an imidazole compound, a combination of any two from different modified amine compounds and/or imidazole compounds may be used.

Phenol resin (b) used in combination with the modified polyamine (a) is, for example, a phenolic resin synthesized from phenols and aldehydes. As the phenols, compounds such as phenol, cresol, ethylphenol, n-propyl phenol, isopropyl phenol, butyl phenol, tert-butylphenol, octylphenol, nonylphenol, dodecylphenol, cyclohexylphenol, chlorophenol, bromophenol, resorcinol, catechol, hydroquinone, 2,2-bis (4-hydroxyphenyl) propane, 4,4'-thiodiphenol, dihydroxy diphenyl methane, naphthol, terpene phenol, phenol dicyclopentadiene or the like may be used. As the aldehydes, for example, formaldehyde may be used.

An amount used of the cyanate ester resin (A) and the epoxy resin (B) can be varied over a wide range. Typically, the epoxy resin (B) is 1 to 10000 parts by weight, preferably 10 to 1000 parts by weight, more preferably 20 to 500 parts by weight, based on 100 parts by weight of the cyanate ester resin (A).

Furthermore, a used amount of a latent hardener (C) can be varied over a wide range. Typically, the latent hardener (C) is 1 to 100 parts by weight, and preferably 5 to 60 parts by weight, based on 100 parts by weight of total content of the cyanate ester resin (A) and the epoxy resin (B).

In the photocurable adhesive, for ease of handling, various solvents can be preferably used by dissolving the photocurable adhesive in an organic solvent. Suitable organic solvents include ethers such as tetrahydrofuran, 1,2-dimethoxyethane, and 1,2-diethoxyethane; alcohols such as iso- or n-butanol, iso- or n-propanol, amyl alcohol, benzyl alcohol, furfuryl alcohol and tetrahydrofurfuryl alcohol; ketones such as methyl ethyl ketone, methyl isopropyl ketone and methyl butyl ketone; aromatic hydrocarbons such as benzene, toluene and xylene; trimethylamine, pyridine, dioxane, acetonitrile or the like.

In addition, the photocurable adhesive includes a light-absorbing component which thermally cures the epoxy type adhesive component. The light-absorbing component may use, for example, a light-absorbing materials such as carbon black, black metal complex paints, azine paints and nigrosin compounds. The nigrosine compounds, for example, may be a nigrosine sulfate, water-insoluble nigrosine-based compounds such as phosphoric acid salts or the like. The light-absorbing component may be used alone, or it may also be used by mixing two or more kinds of light-absorbing compound.

The light-absorbing component includes preferably carbon black as a main component, and more preferably the light-absorbing component includes carbon black. In this case, the curability of the photocurable adhesive by irradiating the laser light is further improved.

As an inorganic filler, for example, silica, alumina, aluminum nitride, glass, boron nitride, titanium dioxide, kaolin, clay, talc, carbon fiber, iron oxide, diamond or the like may be used. The inorganic filler preferably has translucency, and more preferably the infrared laser light transmittance at a wavelength of 800 nm to 1100 nm is 80% or more. In this case, the curability of the photocurable adhesive is improved. It is possible to control a thermal conductivity before and after curing of the photocurable adhesive to the above-described desired ranges by adjusting the material and/or content of the inorganic filler.

MODE FOR CARRYING OUT THE INVENTION

First Embodiment

In the present embodiment, to produce a plurality of photocurable adhesive having a different composition, an example is given to evaluate curing properties of the plurality of photocurable adhesive. As shown in FIG. 1, a photocurable adhesive 1 according to an embodiment of the present embodiment includes an epoxy type adhesive component 11, a light-absorbing component 12, and an inorganic filler 13. The light-absorbing component 12 and the inorganic filler 13 are dispersed in the epoxy type adhesive component 11. Hereinafter, a production method of the photocurable adhesive 1 is described.

(1) Synthetic of Modified Polyamine and Preparation of Latent Curing Agent

First, 1,2-diaminepropane 201 g was introduced into a flask and heated to 60° C. Here, ADEKA RESIN EP-4100E ((Ltd.) trade name of ADEKA: bisphenol A type epoxy resin, epoxy equivalent 190) 580 g was added gradually so that the system temperature may be maintained at 100 to 110° C. [an epoxy equivalent of ADEKA RESIN EP-4100E against 1,2-diaminopropane 1 mol: 1.12]. After the addition of ADEKA RESIN EP-4100E, the system temperature was raised to 140° C. After reacting for 1.5 hours, the modified polyamine was obtained. 30 g of a phenol resin was introduced into the obtained 100 g of modified amine. Here, the solvent was removed over a period of 1 hour at 30 to 40 torr at a temperature of 180 to 190° C. to obtain a latent curing agent.

(2) Production of Photocurable Adhesive

A cyanate ester resin (cyanate LeCy Lonza Corp.), an epoxy resin ((Ltd.) ADEKA Corporation; EP-4100E, bisphenol A type epoxy resin, equivalent 190), a light-absorbing component (manufactured by Mitsubishi Chemical carbon black; 750B) and an inorganic filler (silica) were stirred, dissolved, mixed, and dispersed. Then, the latent curing agent was added to the mixture, stirred, dissolved, mixed, dispersed. Here, as shown in FIG. 1, the photocurable adhesive 1 including the epoxy type adhesive component 11, the light-absorbing component 12 and the inorganic filler 13 was obtained. A mixing ratio of the cyanate ester resin and an epoxy resin and a latent hardener, 1 weight ratio: 1:1. In addition, a compounding ratio of the inorganic filler 13, the total amount of the cyanate ester resin and an epoxy resin and the latent curing agent as shown in Table 1 below, that is, 55 parts by weight per 100 parts by weight epoxy type adhesive component. In addition, a content of the light-absorbing component 12 in the photocurable adhesive 1 (wt. %), that is, an amount of the light-absorbing component 12 to a total amount of the epoxy type adhesive component 11, the light-absorbing component 12 and the inorganic filler 13 was adjusted as shown in Table 1 below. In this manner, the light-absorbing component 12 amounts for five different photocurable adhesives (sample X1 to X5) were prepared.

Figure 2:
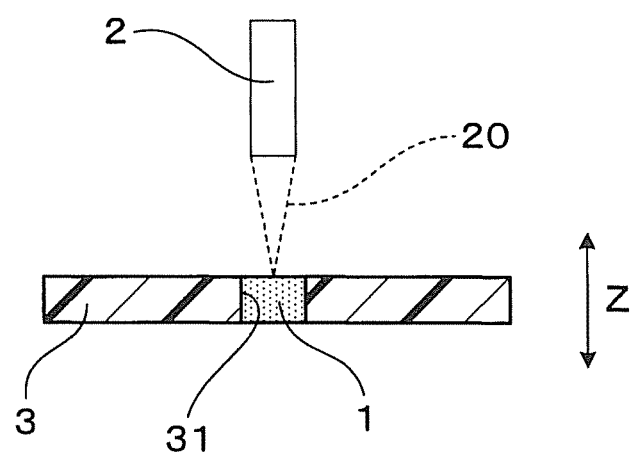
FIG. 2 is an explanation drawing showing a cross-sectional structure which expresses a state that an adherend coated with the photocurable adhesive is irradiated by laser light (a semiconductor laser having a wavelength 915 nm) according to the first embodiment.

Then, a curing test of the photocurable adhesive of each of samples was performed. Specifically, first, as shown in FIG. 2, a through hole 31 was opened to an adherend 3 plate of thickness 2 mm made of polyphenylene sulfide (PPS) resin. Then, the photocurable adhesive 1 is applied to the adherend 3 by filling the photocurable adhesive 1 to the through hole 31 with dispenser.

After coating, laser 20 was irradiated directly from laser head 2 (JDSU of trade name "IDL50") to the photocurable adhesive 1. Irradiation direction is a direction Z of a coating thickness of the photocurable adhesive 1. The output of the laser light 20 used in the present embodiment was 3 W, and irradiation time was 5 seconds. The photocurable adhesive 1 was cured by irradiation of the laser light 20.

Then, a thermal conductivity of the each of samples before and after curing was determined. Determination of the thermal conductivity was performed based on ASTM D5470 using a resin material thermal resistance measurement device manufactured by a Hitachi Technologies and Services. The results are shown in Table 1.

In addition, a presence or absence of tack (tacky property) of the each of samples after curing was evaluated. Specifically, the surface of the photocurable adhesive 1 was touched after irradiation of the laser light 20 to confirm the presence or absence of tack for each of samples. Situations where tack was absent were evaluated as "Good", and cases where there is tack were evaluated as "Poor". The results are shown in Table 1.

Further, a carbonization of the surface of the each of samples after curing visually is determined. When the carbonization of the surface was not observed was evaluated as "Excellent", a case where the thin carbonized part was slightly observed was evaluated as "Good", and a case where the carbonization was clearly observed was evaluated as "Poor". The results are shown in Table 1.

TABLE 1

|  |  | Sample No. | | | | |
|---|---|---|---|---|---|---|
|  |  | Sample X1 | Sample X2 | Sample X3 | Sample X4 | Sample X5 |
| Epoxy Type Adhesive Component (parts by weight) |  | | | 100 | | |
| Inorganic Filler (parts by weight) |  | | | 55 | | |
| Light-absorbing Component (wt. %) |  | 0.001 | 0.005 | 0.01 | 0.1 | 0.5 |
| Thermal Conductivity (W/m · K) | Before Curing | 0.2 | 0.2 | 0.2 | 0.2 | 0.2 |
|  | After Curing | 0.5 | 0.5 | 0.5 | 0.5 | 0.5 |
| Curing Test | Adhesive Evaluation | Good | Good | Good | Good | Good |
|  | Carbonization Evaluation | Excellent | Excellent | Good | Good | Poor |

The "Curing Test" is performed using samples each 2 mm thick.

As shown in Table 1, when the content of the light-absorbing component 12 in the photocurable adhesive 1 in each of the samples X1 to X4, which is not more than 0.1 mass %, was used, carbonization of the surface by the irradiation of the laser light 20 was reduced (refer to FIG. 1 and FIG. 2). In addition, when the content of the light-absorbing component 12 in the sample X5, which is 0.5 mass %, was used, carbonization of the surface was confirmed. Therefore, the content of the light-absorbing component 12 in the photocurable adhesive 1 is preferably not more than 0.1 mass %. To further reduce carbonization, the content of the light-absorbing component 12 is preferably under 0.01 mass %, the content of the light-absorbing component 12 is more preferably 0.005 mass %. The slight content of the light-absorbing component 12 has an addition effect, in this case, the content of the light-absorbing component 12 is preferably not less than 0.001 mass %. Further, as shown in Table 1, each of the samples X1 to X5, each of which has a different content of the light-absorbing component 12 respectively, was cured with a 2 mm thickness thereof. However, none of the cured materials were tacky. In short, the photocurable adhesion 1 of each of the samples X1 to X5 can be sufficiently cured by irradiation of the laser light 20.

Next, a plurality of photocurable adhesives (samples X6 to X11), each of which has a different amount and kind of filler, were produced. These samples were produced in the same way as the above-described samples X1 to X5 except for changing the amount and kind of the fillers as can be seen in Table 2. The curing test of each of the samples X6 to X11 which were 2 mm thick was performed in the same way as the samples X1 to X5. Further, evaluations of the adhesion and the carbonization of the surface were performed. In the samples X6 and X8, the evaluations of the adhesion and the carbonization when a 5 mm thickness of each of the samples X6 and X8 were cured are shown. For irradiation conditions of the laser light 20 when the thickness of the photocurable adhesive was set to be 5 mm, the output power was 3 W and irradiation time of the laser light 20 was 10 seconds. The results are shown in Table 2.

above-described range by including the inorganic filler 13. Therefore, heat generated by irradiation of the laser light 20 is sufficiently transferred from the surface of the photocur-

TABLE 2

| | | Sample No. | | | | | |
|---|---|---|---|---|---|---|---|
| | | Sample X6 | Sample X7 | Sample X8 | Sample X9 | Sample X10 | Sample X11 |
| Epoxy Type Adhesive Component (parts by weight) | | | | 100 | | | |
| Filler (parts by weight) | Silica | — | 0.1 | 55 | 90 | — | — |
| | Alumina | — | — | — | — | 55 | — |
| | Acrylate Resin | — | — | — | — | — | 55 |
| Light-absorbing Component (wt. %) | | | | 0.005 | | | |
| Thermal Conductivity (W/m · K) | Before Curing | 0.1 | 0.1 | 0.2 | 0.5 | 0.65 | 0.1 |
| | After Curing | 0.27 | 0.27 | 0.5 | 0.9 | 1.02 | 0.3 |
| (1) Curing Test | Adhesive Evaluation | Good | Good | Good | Good | Good | Poor |
| | Carbonization Evaluation | Poor | Poor | Excellent | Excellent | Good | Poor |
| (2) Curing Test | Adhesive Evaluation | Poor | — | Good | — | — | — |
| | Carbonization Evaluation | Poor | — | Excellent | — | — | — |

The "(1) Curing Test" is performed using samples each 2 mm thick.
The "(2) Curing Test" is performed using samples each 5 mm thick.

As can be seen in Table 2, each of the samples X8 to X10 whose thermal conductivity before curing is not less than 0.2 W/m·K and whose the thermal conductivity after curing is not less than 0.5 W/m·K was sufficiently cured without tackiness after curing and hardly had carbonization of the surface in comparison with each of the samples X6, X7 and X11. The thermal conductivity before and after curing of each of the samples X6, X7 and X11 is out of a range of that of each of the samples X8 to X10. For adjusting the thermal conductivity before and after curing of the samples X6, X7 and X11 to the above-described range, use of 55 parts by weight of the inorganic filler 13 per 100 parts by weight epoxy type adhesive component is preferable. In the inorganic filler 13, silica and/or alumina are preferably included as a main component in an inorganic filler and the inorganic filler 13 is more preferably made up of silica and/or alumina. When an amount of the inorganic filler to the epoxy type adhesive component is increased, mixing of the starting materials may be difficult. With this, application of the photocurable adhesive obtained by the mixture may become difficult. From such a viewpoint, a content of the inorganic filler 13 per 100 parts by weight epoxy type adhesive is preferably not more than 85 parts by weight. As can be seen in Table 2, to further reduce the carbonization, the inorganic filler 13 is more preferably made up of silica. As shown in the sample X8, the photocurable adhesive 1 which satisfies the above-described range of the thermal conductivity can be sufficiently cured without generation of the carbonization by direct irradiation of the laser light 20 even when the thickness of the sample X8 is set to be 5 mm.

Thus, in the present embodiment, the photocurable adhesive 1 whose light-absorbing component 12 is not more than 0.1 mass % and whose the thermal conductivity before curing is not less than 0.2 W/m·K and whose the thermal conductivity after curing is not less than 0.5 W/m·K can be cured by direct irradiation of the laser light 20. The photocurable adhesive 1 can be sufficiently cured even when the coating thickness of the photocurable adhesive 1 is increased (refer to FIG. 1 and FIG. 2). That is to say, in the photocurable adhesive 1, carbonization of the surface is unlikely to occur. This is because the content of the light-absorbing component 12 is low and the transmittance of the laser light 20 is increased. The thermal conductivity before and after curing of the photocurable adhesive 1 is adjusted to the above-described range by including the inorganic filler 13. Therefore, heat generated by irradiation of the laser light 20 is sufficiently transferred from the surface of the photocurable adhesive 1 to inside the photocurable adhesive 1. Thus, the photocurable adhesive 1 can be sufficiently cured.

In the present embodiment, the coating thickness of the photocurable adhesive 1 to the adherend 3 is preferably not less than 1 mm. Further, the laser light 20 preferably irradiates directly the photocurable adhesive 1 in a thickness direction Z of the photocurable adhesive 1 (refer to FIG. 2). In this case, even when the laser light 20 irradiates directly the photocurable adhesive 1 whose coating thickness is comparatively large, a functional effect that the photocurable adhesive 1 can be cured almost without carbonizing the surface of the photocurable adhesive 1 is reliably confirmed. The output power condition and the irradiation time of the laser to cure the photocurable adhesive 1 and the like can be changed, as necessary. In addition, the coating thickness of the photocurable adhesive 1 is preferably not more than 10 mm and 5 mm is more preferable, from a viewpoint of a difficulty of curing by irradiation of the laser light 20.

In addition, the light-absorbing component 12 is preferably made up of carbon black as in the present embodiment. In this case, the photocurable adhesive 1 can be cured by irradiation of the laser light 20 in a relative short time. A curing time of the photocurable adhesive is not more than 30 seconds. The photocurable adhesives of the samples X1 to X4 and X8 to X10 in the present embodiment can be cured in a short time of, for example, 10 seconds or less.

Second to Fifth Embodiments

Next, variations of examples of use of a photocurable adhesive. As shown in after-mentioned FIG. 3 to FIG. 7, a photocurable adhesive 1 (samples X1 to X4 and X8 to X10 in the first embodiment) may be used as a screw or a solder replacement, seal material or the like. Incidentally, the second to fifth embodiments use the same reference numerals as in first embodiment, and where the same configuration is shown, reference is made to the preceding description.

Second Embodiment

Figure 3:
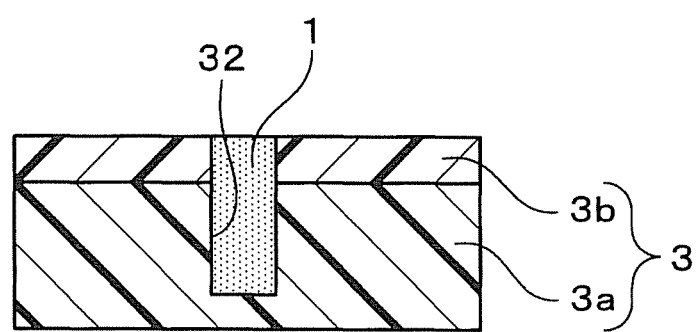
FIG. 3 shows a cross-sectional view of an adherend which is made up of a case and a cover which are bonded and fixed to each other by a photocurable adhesive according to a second embodiment of the present invention.

As shown in FIG. 3, the example of use of a photocurable adhesive 1 used as a screw replacement is described below. As shown in FIG. 3, an adherend 3 of the present embodiment is, for example, made up of a case 3a and a lid 3b of the case 3a. In the FIG. 3, the case 3a is formed in box shape (not shown) and has a space therein in which other parts can be housed. A communication hole 32 is formed between the case 3a and the lid 3b, and the photocurable adhesive 1 is injected therein. The communication hole 32 is cured by irradiation of the same laser light as the first embodiment. Conventionally, screws are used for joining such a case 3a and the lid 3b, however, the photocurable adhesive 1 may also be used as in the present embodiment. This is because, as shown in first embodiment, the photocurable adhesive 1 (for example, samples X1 to X4 and X8 to X10) may be sufficiently cured by direct irradiation of the laser light almost without carbonization or the like occurring even when a coating thickness thereof is increased. The following third to fifth embodiments are applicable to each purpose for the same reason.

Third Embodiment

Figure 4:
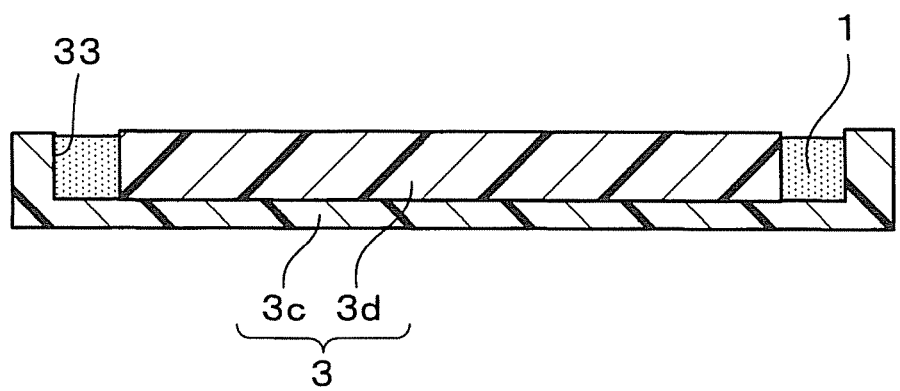
FIG. 4 shows a cross-sectional view of an adherend which is made up of a housing and a component being disposed on the housing which are bonded and fixed to each other by a photocurable adhesive according to a third embodiment of the present invention.

As shown in FIG. 4, a photocurable adhesive 1 (for example, samples X1 to X4 and X8 to X10) may be also used as a cast molding material. Specifically, an adherend 3 of the present embodiment is made up of a housing 3c and a part 3d. The housing 3c constitutes a mold of the adherend 3. The part 3d is disposed in the housing 3c. In addition, the photocurable adhesive 1 is injected to a space 33 disposed between the housing 3c and the part 3d, and the photocurable adhesive 1 is cured by irradiation of the same laser light as in the first embodiment.

Fourth Embodiment

Figure 5:
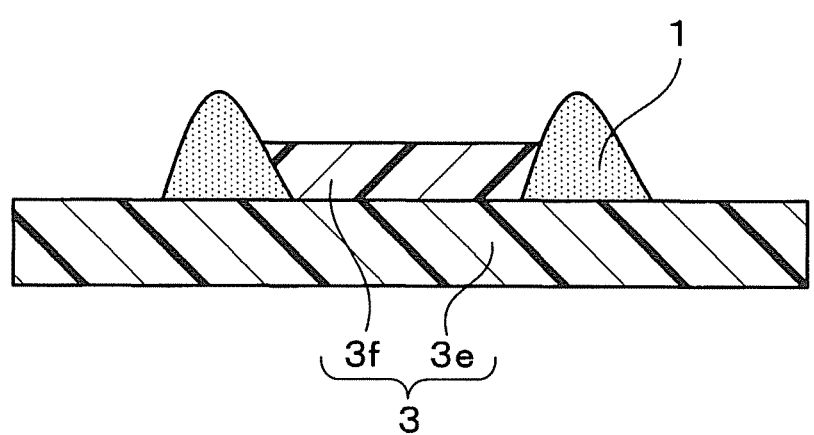
FIG. 5 shows a cross-sectional view of the an adherend which is made up of a circuit board and an electronic component which are bonded and fixed to each other by a photocurable adhesive according to a fourth embodiment of the present invention.
Figure 6:
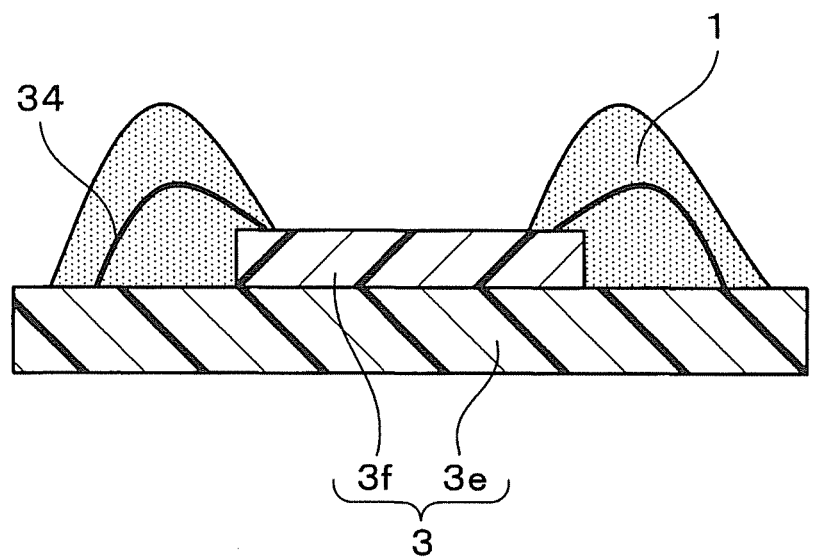
FIG. 6 shows a cross-sectional view of the adherend which is made up of the circuit board and the electronic component, and which has a lead wire being sealed by the photocurable adhesive according to the fourth embodiment.

As shown in FIG. 5 and FIG. 6, a photocurable adhesive 1 (for example, samples X1 to X4 and X8 to X10) may be also used as a solder replacement. As shown in FIG. 5 and FIG. 6, an adherend 3 of the present embodiment is made up of a circuit board 3e and an electronic part 3f mounted on the circuit board. As shown in FIG. 5, the photocurable adhesive 1 is applied to the periphery (for example, four corners) of the electronic part 3f, and the photocurable adhesive 1 is cured by irradiation of the same laser light as the previous embodiments. Further, as shown in FIG. 6, when there is a lead wire 34 which electrically connects the electronic part 3f and the circuit board 3e, the lead wire 34 may be sealed while gluing the electronic part 3f and the circuit board 3e by curing of the photocurable adhesive 1.

Fifth Embodiment

Figure 7:
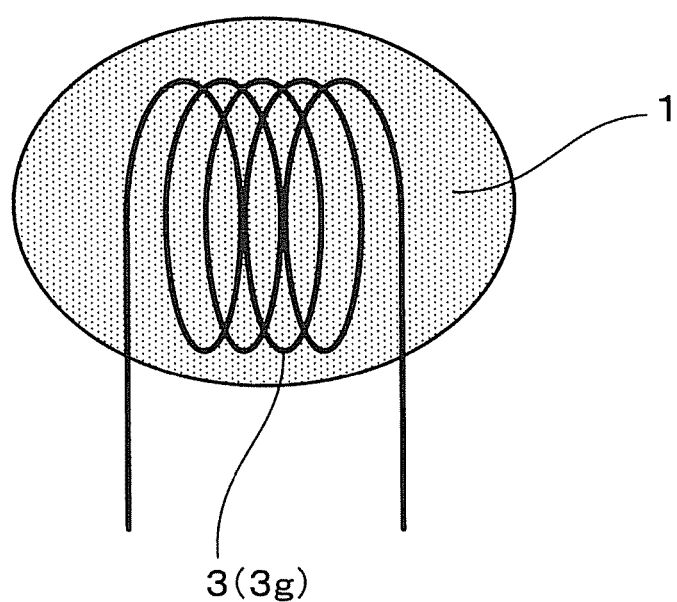
FIG. 7 shows a cross-sectional view of an adherend which is made up of a coiled lead wire being bonded and fixed by a photocurable adhesive according to a fifth embodiment of the present invention.

As shown in FIG. 7, a photocurable adhesive 1 (for example, samples X1 to X4 and X8 to X10) may be also used as a seal material. As shown in FIG. 7, an adhesive 3 of the present embodiment is a lead wire 3g wound into a coil. The coil-shaped lead wire 3g is covered by the photocurable adhesive 1, and the photocurable adhesive 1 is cured by irradiation of the same laser light as the first embodiment. Therefore, the coil-shaped lead wire 3g is sealed by the photocurable adhesive 1.

What is claimed is:

1. An adhesive which is cured by irradiation of a laser light, the adhesive comprising:
    an epoxy type adhesive component comprising an epoxy resin, a cyanate ester resin, and a hardener;
    a light-absorbing component; and
    an inorganic filler,
    wherein the light-absorbing component has a concentration of not more than 0.1 mass % relative to a total amount of the epoxy type adhesive component, the light-absorbing component, and the inorganic filler,
    wherein the inorganic filler has a concentration of from 55 to 85 parts by weight per 100 parts by weight of the epoxy type adhesive component to provide the adhesive with a thermal conductivity before curing of not less than 0.2 W/m·K and a thermal conductivity after curing of not less than 0.5 W/m·K, and
    wherein the adhesive is configured to be cured by directly irradiating the adhesive with the laser light.

2. The adhesive as set forth in claim 1, wherein the adhesive is configured to be applied to two components and to have a thickness of not less than 1 mm, such than when the adhesive is directly illuminated by laser light, a surface and an inside portion of the adhesive is cured, such that the two components are bonded together.

3. The adhesive as set forth in claim 1, wherein the light-absorbing component comprises carbon black.

4. The adhesive as set forth in claim 1, wherein the inorganic filler comprises silica or alumina.

5. The adhesive as set forth in claim 1, wherein an infrared laser light having a wave length of 800 nm to 1100 nm has a transmittance of 80% or more through the inorganic filler.

6. The adhesive as set forth in claim 1, wherein the light-absorbing component has a concentration of from 0.001 to 0.01 mass % relative to a total amount of the epoxy type adhesive component, the light-absorbing component, and the inorganic filler.

7. The adhesive as set forth in claim 1, wherein the hardener includes a modified polyamine with one or more amino groups and an active hydrogen, and a phenolic resin.

8. The adhesive as set forth in claim 1, wherein the adhesive has a thickness of from 1 mm to 10 mm.

* * * * *